May 13, 1924.
F. J. REICHMANN
VEHICLE
Filed Jan. 14, 1921
1,494,078
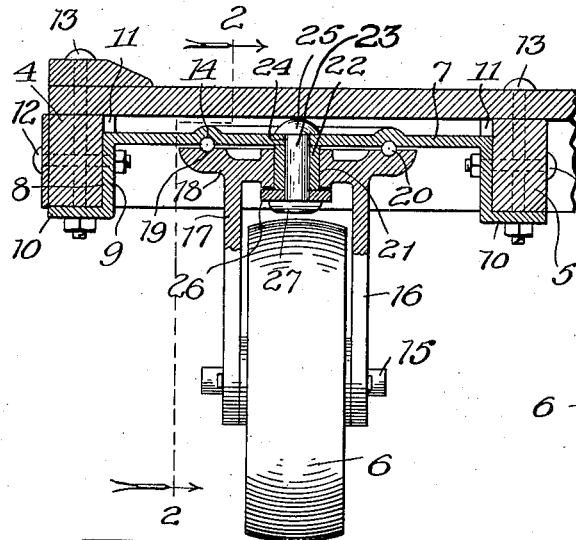
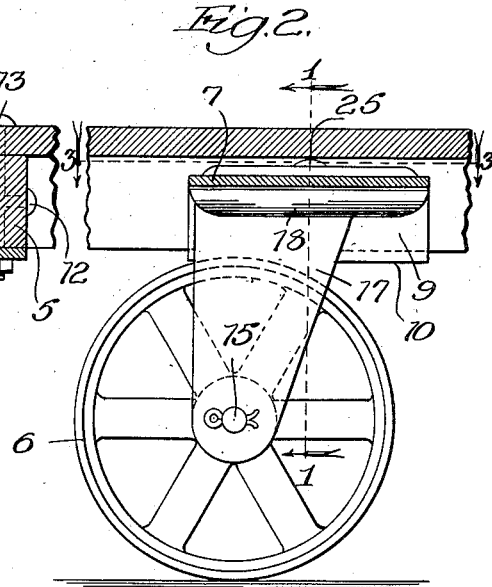
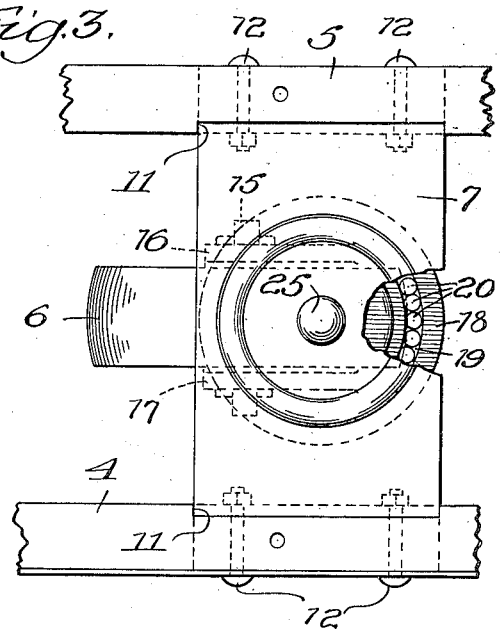
Inventor:
Frank J. Reichmann,
By Dyrenforth, Lee, Chritton & Wiles,
Attys.

Patented May 13, 1924.

1,494,078

UNITED STATES PATENT OFFICE.

FRANK J. REICHMANN, OF CHICAGO, ILLINOIS.

VEHICLE.

Application filed January 14, 1921. Serial No. 437,147.

*To all whom it may concern:*

Be it known that I, FRANK J. REICHMANN, a citizen of the United States, residing at Chicago, in the county of Cook and State of Illinois, have invented a new and useful Improvement in Vehicles, of which the following is a specification.

My invention relates, more particularly to improvement in vehicles of the type adapted to be connected to form trains and more particularly to what are known as trailer trucks adapted to be drawn through the medium of trackless motors and involving the use of caster wheels usually at one end only of the vehicle.

As a preface to the following it may be stated that one of the requisites of trucks for use with tractor-trailer operation is that the trucks should be of particularly rugged construction enabling them to withstand the severe strains to which they are subjected in tractor-operation, another requisite being that the trailers be of as light weight as possible consistent with the strength required, in order that they may not require excessive power in their operation and shall permit of comparatively easy hand operation, it being understood that even in the case of power-drawn trailers it oftentimes becomes necessary to shift them from place to place, even when heavily loaded, by hand. Another desirable requisite of a trailer truck is that it be so designed that the platform thereof be as close to the ground as possible, this factor of height being of greatest importance in the loading and unloading of the trucks, it having been found in practice that the most desirable distance from the top of the platform to the ground is about fourteen inches.

My primary objects are to provide improvements in trailer trucks, to the end that they may be rendered of lighter construction, for any given degree of strength required, be more economical of manufacture, be highly resistant to the various stresses to which they are subjected in use, and permit in a caster-wheel construction of the employment of a relatively large caster-wheel in a structure wherein the platform extends relatively close to the ground. Another object is to provide a construction of trailer truck of the center sill type which shall be highly resistant to stresses in use. Another object is to permit of ease in assembling the various parts of a trailer structure; and other objects as will be manifest from the following description.

Referring to the accompanying drawing:

Figure 1 is a section taken transversely through one side portion of a truck of the caster wheel type and embodying my invention, the section being taken at the line 1—1 on Fig. 2 and viewed in the direction of the arrows. Figure 2 is a section taken at the irregular line 2—2 on Fig. 1 and viewed in the direction of the arrows; and Figure 3 a plan sectional view taken at the line 3—3 on Fig. 2 and viewed in the direction of the arrows.

In the particular construction illustrated a truck is shown which involves the use of side sills extending lengthwise of the truck, one only of such sills being shown and illustrated at 4, and a center sill structure formed of a pair of sills spaced apart and extending lengthwise of the vehicle, one of these center sills being shown at 5, the truck of the particular construction shown being provided with a pair of caster-wheels at one end of the vehicle and arranged at opposite sides of the center sill structure, one only of these caster-wheels, however, being illustrated at 6. The invention is applicable to a structure in which only one caster-wheel is employed. The showing in the drawing may be taken as showing the embodiment of the invention where only one caster-wheel is employed or where more than one is employed, as before stated, the latter being the case in the construction shown.

The caster-wheel structure shown comprises a plate member 7 which is located between the sill members 4 and 5 and extends crosswise of the vehicle, with its ends recessed as indicated at 8 preferably by forming the plate 7 with the downwardly and outwardly directed flanges 9 and 10 respectively, the flanges 9 setting into gains 11 in the opposite faces of the sill members referred to and the flanges 10 overlapping the under sides of these sills, the sills therefore extending into the recesses 8. A horizontal series of bolts 12 extend through the sills 4 and 5 and flanges 9 and serve to rigidly clamp the plate member 7 to these sills, a so-called split-bolt 13 extending vertically through each of the sills 4 and 5 and the underlying flanges 10, preferably just back of the forward bolts and between the bolts 12 of each series thereof and operating to resist tendency to splitting of the sills 4 and 5 which are shown as made of wood, when the caster-wheel meets with obstruction in its movement over the surface on which it travels in use. The plate 7, together with its flanges referred to, is preferably pressed into shape from sheet steel, the body of the plate 7 having formed therein, preferably by pressing, an annular groove 14 of semi-circular shape in cross section forming a ball race, this ball race being preferably located midway between the flanges 9. The caster-wheel 6 is shown as pivoted on a shaft 15 mounted at its ends in the fork portion 16 of a bracket 17 which is preferably constructed of cast metal, its upper end being formed with a head 18 presenting an annular ball race 19 between which and the ball race 14, ball bearings 20 are interposed. The head 18 contains a vertically disposed aperture 21 concentric with the ball races referred to, there being provided in this opening a spacer member 22 in the form of a pipe. The swiveling device for the bracket 17 is shown as in the form of a rivet 23 which extends downwardly through an opening 24 in the plate 7, its head represented at 25 being located above this plate, and downwardly through the spacer 22 and through a washer 26 which abuts the lower surface of the spacer 22, the head of the lower end of the rivet and represented at 27 overlapping the under side of this washer. The parts just described are so proportioned that when they are assembled as shown and the rivet is swaged into the condition shown, there will be sufficient clearance between the head 18 of the bracket and the washer 26, to insure the proper freedom of rotary movement of the bracket relative to the plate 7, but not to present an undesirable degree of looseness.

It will be understood from the foregoing that by forming the structure in accordance with my invention the parts thereof may be readily and economically manufactured, and will present a high degree of durability and resistance to stresses to which such structures are subjected in use. Furthermore, the manner of swiveling the bracket 17 to the plate 7 as described permits of the assembly of the parts forming the swivel connection, by a quick operation and without requiring a high degree of skill, for causing the bracket to be supported with the desired amount of clearance hereinbefore referred to.

It will be understood that by the construction described, a relatively large caster-wheel may be employed in a truck wherein the top of the platform extends relatively closely to the ground, it being possible by this construction to use a caster-wheel of substantially ten inches in diameter in a truck wherein the platform extends only about fourteen inches from the ground, which greatly facilitates loading and unloading of the truck. Furthermore, the truck is rendered very rugged and highly resistant to the severe stresses to which it is subjected in use.

The feature of setting the plates 7 into gains in the sides of the sills, is of great advantage in that stresses, as for example those caused by the trailer colliding with objects as for example curbs, directed by the caster-wheel-supporting plate against the sills in a direction lengthwise of the latter are resisted by the end grain of the wood of which the sills are formed, throughout substantially the full depth of the sill, before strain is exerted against the bolts securing the plate to the sills, thereby greatly relieving stress on the bolts.

The feature of providing the lower flanges 10 of the plate 7 which are set under the sills 5 is of advantage in that it operates to support the load in a manner to greatly relieve the bolts, and particularly where the member 7 is of steel in view of its great strength, relatively light weight, economy of cost and small space which it occupies.

The ball-race in the plate 7 is so arranged that it may be pressed to form at one heat thereof and at one blow on a bulldozer, the flanges 9 and 10 being formed at the same operation. Furthermore, by providing the plate 7 as shown, all of the holes in this plate may be produced by the punching method, and thus involve the minimum expense.

It will also be noted that, in the preferred construction shown, the fork plate 18 is formed with a lip surrounding the opening 21 therein, thereby permitting of the forming of this plate, to cause the distance from the bottom of the ball race 19 to the lower edge of this lip, to be of the desired distance, by merely surfacing the bottom of this lip with a surfacing tool. Furthermore, the spacer 22 may be merely a piece of pipe sawed off to the desired length, the various features just referred to greatly economizing in the production of the structure.

The arrangement as shown permits of the relatively heavy hammering of the rivet 23 for assembling the parts as stated, without destroying the desired clearance between the balls 20 and the race-ways 14 and 19. This clearance should be kept substantially uniform in order to permit of the comparatively easy turn of the pivot of the caster-wheel especially for hand operation of the truck and also to prevent excessive play of these parts in the case of forces being abruptly applied to the structure as in the case of collisions, and these results are accomplished in my improved structure.

By preference the opening 21 is slightly larger than the spacer 22 in order that side thrust exerted on these parts will be taken up by the ball-racers and the balls, instead of directly by the rivet, thereby affording greater strength of the structure and minimizing wear on the rivet 23.

While I have illustrated and described a particular construction embodying my invention, I do not wish to be understood as intending to limit it thereto, as the same may be variously modified and altered without departing from the spirit of my invention.

What I claim as new and desire to secure by Letters Patent, is:

1. In a trailer truck, the combination with sills thereof, of a plate member, means connecting said plate member to said sills, said plate member being formed of metal pressed to present an annular rolling bearing race in its under side of relatively great diameter, a caster-wheel pivoted on said plate member and having a rolling-bearing race, with rolling-bearing members interposed between said races.

2. In a trailer-truck, the combination with sills thereof, of a plate member extending crosswise of said sills and having recesses at its ends into which said sills extend, means connecting said plate member to said sills, said plate member being formed of metal pressed to present an annular rolling bearing race in its under side, and a caster wheel pivoted on said plate member and having a rolling bearing race with rolling bearing members interposed between said races.

3. In a trailer truck, the combination with sills, of a plate member extending crosswise of said sills, fastening devices extending through said plate member and through said sills, said fastening devices extending substantially horizontal and securing said plate member to said sills, bolts extending through said sills in a direction crosswise of said fastening devices, and a caster-wheel pivotally connected with said plate member.

4. In a trailer truck, the combination with wood sills thereof extending lengthwise of the truck, of a plate member extending crosswise of said sills and having recesses at its ends into which said sills extend, bolts extending through said sills and through the upwardly-extending walls of said recesses, other bolts extending through said sills in a direction crosswise of said first-referred-to bolts and through the bottom walls of said recesses, and a caster-wheel pivotally connected with said plate member.

5. In a trailer truck, the combination with its body, of a bearing member on said body, a caster-wheel bracket, a wheel journaled in said bracket, a pivot pin engaging said bearing member and bracket, and a tubular spacer member extending through said bracket and surrounding said pivot pin.

6. In a trailer truck, the combination with its body, of a bearing member on said body, a caster-wheel bracket, a wheel journaled in said bracket, a pivot pin engaging said bearing member and bracket, a tubular spacer member extending through said bracket and surrounding said pivot pin, and rolling bearings interposed between said bracket and said plate member.

7. In a trailer truck, the combination with wood sills thereof, of a plate member extending crosswise of said sills and having portions which extend crosswise of, and engage the end grain of the wood of the sills, means connecting said sills with said plate, and a caster-wheel pivotally connected with said plate.

8. In a trailer truck, the combination with sills thereof, containing recesses in faces thereof, of a plate member extending crosswise of said sills and projecting into said recesses, means connecting said sills with said plate, and a caster-wheel pivotally connected with said plate.

9. In a trailer-truck, the combination with sills thereof, of a plate member, means connecting said plate member to said sills, said plate member being spaced from the platform above it and formed with a rolling bearing race on its under side and with an annular rib on its upper surface directly above, and concentric with, said race, a caster-wheel pivoted on said plate member and having a rolling bearing race, and rolling bearing members interposed between said races.

10. In a trailer-truck, the combination with sills thereof, of a plate member extending crosswise of said sills and having recesses at its ends into which said sills extend, mean connecting said sills with said plate, said plate containing an annular rolling bearing race on its under surface, a caster-wheel pivotally connected with said plate and containing an annular rolling bearing race on its upper surface, and rolling bearing members interposed between said races.

11. In a trailer-truck, the combination with sills, of a plate member extending crosswise of said sills and having recesses at its ends into which said sills extend, the bottom walls of said recesses extending beneath said sills, bolts extending through said sills and through the upwardly extending walls of said recesses, and a caster-wheel pivotally connected with said plate member.

FRANK J. REICHMANN.